(12) United States Patent
Sar et al.

(10) Patent No.: US 11,614,312 B2
(45) Date of Patent: Mar. 28, 2023

(54) AERODYNAMIC SOLID NOSE CONE FORMED WITH AN AFOCAL AXICON LENS AND METHOD OF IMAGING

(71) Applicant: Raytheon Company, Waltham, MA (US)

(72) Inventors: David R. Sar, Corona, CA (US); Richard J. Wright, Tucson, AZ (US); Delmar L. Barker, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 395 days.

(21) Appl. No.: 16/876,596

(22) Filed: May 18, 2020

(65) Prior Publication Data

US 2021/0356634 A1    Nov. 18, 2021

(51) Int. Cl.
| | | |
|---|---|---|
| *F42B 15/01* | (2006.01) | |
| *F41G 7/22* | (2006.01) | |
| *F41G 7/26* | (2006.01) | |
| *F42B 10/46* | (2006.01) | |
| *G02B 27/09* | (2006.01) | |

(52) U.S. Cl.
CPC ............ *F42B 15/01* (2013.01); *F41G 7/2293* (2013.01); *F41G 7/26* (2013.01); *F42B 10/46* (2013.01); *G02B 27/0961* (2013.01)

(58) Field of Classification Search
CPC ........ F42B 15/01; F42B 10/46; F41G 7/2293; F41G 7/26; G02B 27/0961
See application file for complete search history.

(56) References Cited

U.S. PATENT DOCUMENTS

| 4,168,813 A | 9/1979 | Pinson et al. |
|---|---|---|
| 4,678,142 A | 7/1987 | Hirschfeld |
| | (Continued) | |

FOREIGN PATENT DOCUMENTS

| GB | 2419932 A | * | 5/2006 | ............. F42B 10/46 |
|---|---|---|---|---|
| GB | 2419932 A | | 5/2006 | |
| | (Continued) | | | |

OTHER PUBLICATIONS

Edmund Optics Worldwide, "An In-Depth Look at Axions," https://www.edmundoptics.com/knowledge-center/application-notes/optics/an-in-depth-look-at-axicons, Apr. 16, 2020.

(Continued)

*Primary Examiner* — Marcus E Windrich
(74) *Attorney, Agent, or Firm* — Schwegman Lundberg & Woessner, P.A.

(57) ABSTRACT

An aerodynamic nose cone capable of imaging through the nose cone is accomplished by forming the nose cone as an Afocal Axicon lens. Under a condition of $RI \approx \cos(X)/\cos(3X)$ where RI is an effective refractive index and X is a cone half angle of the solid right-circular cone. EMR incident on a front portion of the cone undergoes a total internal reflection (TIR) and exits a trailing surface of the cone with approximately the same parallelism with which it entered the cone. EMR incident behind the front portion of the cone that exits the trailing surface with different parallelism than it entered may be directed to a light dump or through a frustum of a cone to re-establish the correct parallelism. The entire optical system may be monolithically integrated into the nose cone to eliminate alignment issues and moving parts.

17 Claims, 13 Drawing Sheets

(56) References Cited

U.S. PATENT DOCUMENTS

| | | | | |
|---|---|---|---|---|
| 5,368,254 | A | * | 11/1994 | Wickholm ............ F41G 7/2253 |
| | | | | 244/3.16 |
| 5,693,907 | A | | 12/1997 | Rudnik |
| 7,423,245 | B2 | * | 9/2008 | Baumgart ............... F42B 10/46 |
| | | | | 244/119 |
| 9,534,868 | B1 | * | 1/2017 | Perryman ............. F41G 7/2293 |
| 9,568,280 | B1 | * | 2/2017 | Perryman ............... F42B 10/46 |
| 2012/0013877 | A1 | * | 1/2012 | Tanaka ............... G02B 27/0961 |
| | | | | 355/77 |
| 2019/0063875 | A1 | * | 2/2019 | Ell ........................ F41G 7/2246 |
| 2022/0212407 | A1 | * | 7/2022 | Matheu .................. B33Y 30/00 |
| 2022/0234134 | A1 | * | 7/2022 | Flamm ................. B23K 26/046 |
| 2022/0291139 | A1 | * | 9/2022 | Nicholas ............ G01N 15/1434 |

FOREIGN PATENT DOCUMENTS

| | | | | |
|---|---|---|---|---|
| WO | WO-2016018873 | A1 | * 2/2016 | ............. F42B 10/46 |
| WO | WO-2016018873 | A1 | 2/2016 | |
| WO | 2018067777 | A1 | 4/2018 | |

OTHER PUBLICATIONS

"International Application Serial No. PCT/US2020/065604, International Search Report dated Mar. 17, 2021", 3 pgs.
"International Application Serial No. PCT/US2020/065604, Written Opinion dated Mar. 17, 2021", 6 pgs.

\* cited by examiner

AERODYNAMIC SOLID NOSE CONE FORMED WITH AN AFOCAL AXICON LENS AND METHOD OF IMAGING

FIELD OF THE INVENTION

This invention relates to nose cones for flight vehicles and, in particular to a solid transparent nose cone for a flight vehicle that is aerodynamically efficient and supports imaging through the nose cone.

DESCRIPTION OF THE RELATED ART

Flight vehicles including but not limited to missiles, rockets, gun-launched projectiles, unmanned aerial vehicles (UAVs), manner aircraft, miniature air launched decoys (MALDs), small diameter bombs (SDBs) and the like may include a nose cone. The nose cone may be configured to provide aerodynamic efficiency and transparency to electromagnetic radiation (EMR) in one or more wavelengths in the UV, visible, IR or MMW bands. The nose cone does not require 100% transparency but must be sufficiently transparent for operation of EMR sensors.

EMR sensors are placed behind the nose cone to provide various capabilities including target detection/acquisition, target discrimination, target identification and aimpoint selection. For example, target detection may simple generate a positive detection of a target in the field of regard and provide a target location. Target discrimination may classify the target as an airplane, a helicopter, a UAV, a missile etc. Target identification may specify a specific type of airplane. Aimpoint selection may specify a certain spot on the airplane.

The different capabilities require progressively higher image fidelity e.g. higher resolution and lower distortion, approaching that of the human eye. At least target discrimination, target identification and aimpoint selection require the capability to "image through the nose cone," which means the nose cone cannot induce unrecoverable distortion. EMR that enters the nose cone should exit the nose cone with the same parallelism. Unfortunately nose cone shapes that induce minimal distortion (e.g., hollow hemispheric domes) are aerodynamically inefficient and nose cones that are aerodynamically efficient (e.g., hollow conical nose cones) induce substantial distortion.

In certain laser-guided munitions (e.g., rockets, projectiles or missiles), EMR passes through the nose cone and is formed into a "spot" on a quadrant detector. In certain munitions, a "bang bang" guidance system controls the flight of the munition to keep the spot in the middle of the quadrant detector to impact the optical centroid of the target. In other munitions, it is desired to extract an angle to target from the quadrant detector. In either case, the optical system is forming a "spot" as the optical centroid of the target and thus does not require high image fidelity through the nose cone. These systems provide target detection/acquisition and a guidance signal to the target. Therefore laser-guided munitions can and are implemented with more aerodynamic nose cones such as ogives and true cones since they can tolerate the induced distortion.

U.S. Pat. No. 4,678,142 to Hirschfeld entitled "Precision Guided Antiaircraft Munition" includes an immersion lens 16 mounted in the nose of projectile 10 that causes received laser radiation to be focused onto a quadrant detector 18. A position of a spot, being the focused reflected laser radiation, on the quadrant detector corresponds to a position of an aircraft in a field of view.

U.S. Pat. No. 9,568,280 to Perryman entitled "Solid Nose Cone and Related Components" includes a solid nose cone that is optically transparent to EMR of a particular wavelength. The solid nose cone is configured to pass EMR incident on the exterior surface to the trailing end. An optical relay adaptor (ORA) (e.g., a fiber optic bundle) is configured to relay EMR from the trailing end of the solid nose cone to a quadrant detector, which has a smaller footprint than the trailing end of the nose cone. In an alternate embodiment, the quadrant detector is directly optically coupled to the trailing end of the nose cone. In both embodiments, EMR incident on any portion of the nose cone is relayed to the trailing end and coupled to the quadrant detector. The solid nose cone is aerodynamically efficient and provides sufficient fidelity to form a spot on the quadrant detector such that the "EMR pattern uniquely correlates received energy with an angle of incidence . . . " (Col 4, lines 55-56). This allows an angle to target to be extracted from the quadrant detector.

U.S. Pat. No. 9,534,868 to Perryman entitled "Aerodynamic Conformal Nose Cone and Scanning Mechanism" discloses translating or tilting a laser beam to pass through the tip of a solid, optically transparent nose cone to generate an angular scan pattern in a far field of the laser beam. A detector such as a single pixel annular detector detects reflected laser energy that passes back through the solid, optically transparent nose cone. A detected signal is correlated to the scan pattern to determine the angle to a target. The solid nose cone is aerodynamically efficient and provides sufficient fidelity to pass the reflected laser to the single pixel annular detector.

In other systems, EMR passes through the nose cone and is formed into an image on an optical detector array (ODA), which converts the EMR image into an array of detected electrical charges. A read out integrated circuit (ROIC) measures the array of detected electrical charges over a specified interval and output electrical signals proportional to the charge as a read out image. The read out image is an image of a target in the field of regard at the particular EMR wavelength, not merely an optical centroid of the target. The read out image can be processed to perform target detection/acquisition to provide a guidance signal, target discrimination, target identification and aimpoint selection as needed. In order to read out a high fidelity image, the nose cone cannot induce distortion and degrade the quality of the image as the incident EMR is relayed through the nose cone. EMR exiting the back of the nose cone should exhibit the same parallelism as the EMR did when entering the nose cone. Unfortunately existing aerodynamically efficient nose cones induce considerable distortion, which cannot be adequately removed by discrete optics or processing. Therefore imaging systems are currently limited to hollow hemispheric domes, which adequately preserve the parallelism of the EMR as it passes through. The optical systems (e.g., a detector and/or laser and optical components) are typically mounted on multi-axes gimbals that rotate and point the optics to scan a field of regard. The hemispheric domes induce considerable aerodynamic drag but must be tolerated to achieve imaging through the nose cone.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides an aerodynamic nose cone capable of imaging through the nose cone. The entire optical system may be monolithically integrated into the nose cone to eliminate alignment issues and moving parts. This is accomplished by forming the nose cone as an Afocal Axicon lens.

In an embodiment, a nose cone comprises a solid right-circular cone that is transparent to EMR of at least one wavelength. The solid right-circular cone is configured to form an Afocal Axicon lens in which EMR incident on a front portion of the solid right-circular cone exits a trailing surface of the solid right-circular cone with approximately the same parallelism (+/−5%) with which the EMR entered the front portion of the solid right-circular cone.

In an embodiment, the solid right-circular cone forms a deep draft Axicon lens such that EMR incident on the front portion of the solid right-circular cone refracts and propagates through the solid right-circular cone where it undergoes a total internal reflection (TIR) at an opposing exterior surface and then exits the trailing surface.

In an embodiment, RI≈cos(X)/cos(3x) where RI is an effective refractive index and X is a cone half angle of the solid right-circular cone. The equality and the parallelism through the nose cone is within plus or minus 5% to support imaging through the nose cone. In different embodiments, RI is between 1.14 and 4.32 and X is between 10 and 26 degrees. The front portion ranges from 35% to 45% of the nose cone over the range of the half cone angles from 10 to 26 degrees.

In an embodiment, an imaging lens is positioned to focus EMR having the same parallelism onto an imaging detector. The imaging lens may be integrated into the trailing surface of the solid right-circular cone.

In an embodiment, EMR incident behind the front portion of the solid right-circular cone exits the trailing surface with a different parallelism than it entered and is directed to a light dump so that this EMR is not focused or otherwise directed onto the imaging detector.

In an embodiment, the solid right-circular cone is coupled to a frustum of a cone to create an Afocal Bi-Conic lens such that EMR incident on the front portion and aft of the front portion of the solid right-circular cone exits the trailing surface of the Afocal Bi-Conic lens with the same parallelism as it entered the cone. Optical power in the form of an imaging lens may be integrated into the trailing surface of the solid right-circular cone and the frustum of the cone to focus the EMR onto a detector.

These and other features and advantages of the invention will be apparent to those skilled in the art from the following detailed description of preferred embodiments, taken together with the accompanying drawings, in which:

DETAILED DESCRIPTION OF THE INVENTION

The present invention provides an aerodynamic nose cone capable of imaging through the nose cone. The entire optical system may be monolithically integrated into the nose cone to eliminate alignment issues and moving parts. This is accomplished by forming the nose cone as an Afocal Axicon lens. EMR incident on a front portion of the lens exits a trailing surface of the cone with approximately the same parallelism which it entered the front portion of the lens. EMR that is plus or minus 5% of the incident parallelism is considered to be of the same parallelism. EMR incident behind the front portion of the cone that exits the trailing surface with different parallelism than it entered may be directed to a light dump or through a frustum of a cone to re-establish the correct parallelism. In either case, only the EMR in which the parallelism is maintained is focused onto an imaging detector.

Figure 1A:
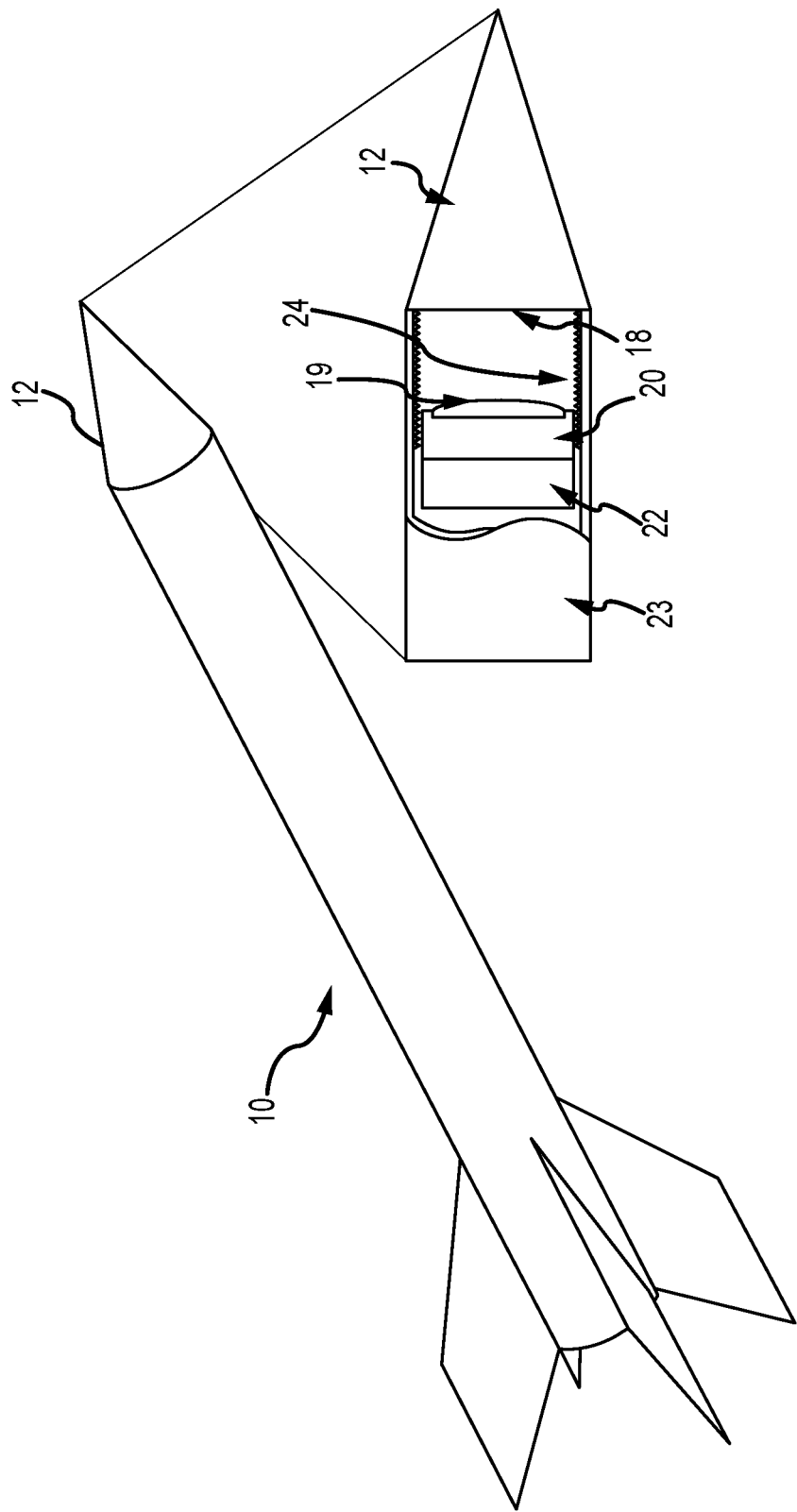
FIGS. 1a and 1b are a perspective view of a missile with an embodiment of a solid nose cone that forms an Afocal Axicon lens that is aerodynamically efficient and supports imaging through the nose cone.
Figure 1B:
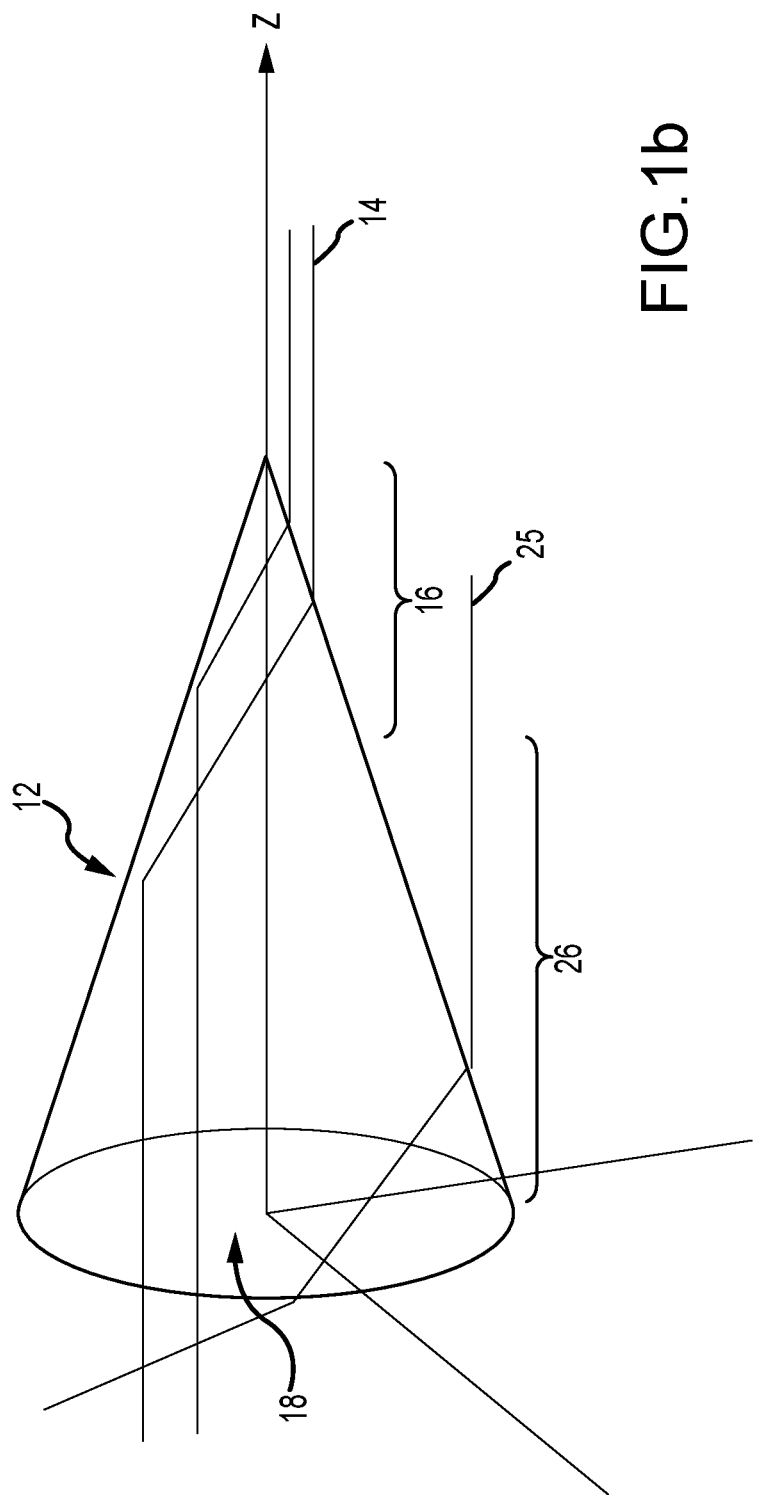

Referring now to FIGS. 1a and 1b, an embodiment of a missile 10 includes a nose cone 12 that is formed as a true cone for aerodynamic efficiency and is transparent to electromagnetic radiation (EMR) of at least one wavelength in the UV (200-400 nm), visible (400-700 nm), IR (700 nm-15 microns) or mmW (15 microns-1 cm) spectral bands. Nose cone 12 is a solid right-circular cone ("a true cone") configured to form an Afocal Axicon lens in which EMR 14 incident on a front portion 16 of the solid right-circular cone undergoes a total internal reflection (TIR) at an opposing exterior surface and exits a trailing surface 18 of the solid right-circular cone with approximately the same parallelism with which the EMR entered the cone.

An imaging lens 19, an imaging detector 20 and a ROIC 22 are positioned in a body 23 of the missile aft of nose cone 12. A light dump 24 is formed on an interior surface of body 22 aft of nose cone 12. EMR 14 exiting trailing surface 18 is focused by imaging lens 19 onto imaging detector 20, which converts the EMR image into an array of detected electrical charges. ROIC 22 measures the array of detected electrical charges over a specified interval and output electrical signals proportional to the charge as a read out image. The read out image is an image of a target in the field of regard at the particular EMR wavelength. EMR 25 that is incident on a back portion 26 of the solid right-circular cone does not have sufficient space to under the TIR and exits trailing surface 18 with a different parallelism than it entered the cone. EMR 25 is directed outwards to light dump 24 that absorbs the EMR so that it is not focused or otherwise redirected to imaging detector 20. Detection of EMR 24 would distort the read out image.

The solid right-circular cone is formed from materials that together cover the entire range from deep UV through visible (Vis), infrared (IR), and Millimeter Wave (mmW). This includes, but not limited to, fused silica (UV-near IR) optical glasses (Vis), transparent plastics such as acrylic (Vis) or polystyrene (Vis), optical crystals such as magnesium/calcium fluoride (Vis-IR) and diamond crystals (Vis-IR), Sapphire (Vis-IR), Spinel (Vis-IR), Aluminum Oxynitride (Vis-IR), NCOC (Vis-IR), etc. IR materials such as ZnS, ZnSe ZnTe, Silicon, Germanium, GaAs, and Millimeter Wave materials such as cross-linked polystyrene, polyethylene, and PTFEs.

Because of the angle of incidence between incoming ENR and the transparent nose cone, the EMR exiting the back of the cone will be partially polarized, with the orientation being radial with respect to the axis of symmetry of the cone. This effect may be ignored or exploited for various applications by placing a polarizing lens behind the cone. Materials can be selected that effect polarization as the rays pass thru the cone. For example, rotationally/spirally polarized materials, birefringement materials such as calcite, as well as non-linear optical materials such as ammonium dihydrogen phosphate.

Referring now to FIGS. 2a-2e, the Afocal Axicon lens represents an evolution from known Axicon and deep draft Axicon lenses to provide a nose cone that is both aerodynamically efficient and capable of imaging through the nose cone. In all cases, we are assuming that the surfaces of the lens are provided with anti-reflection coatings.

Figure 2A:
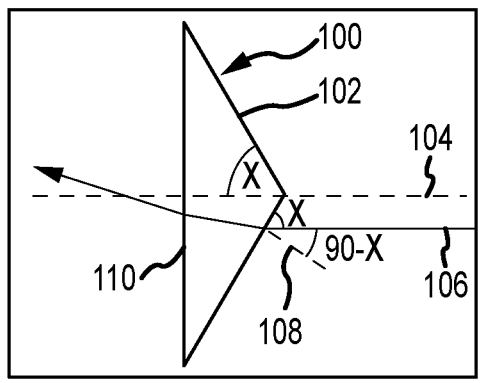
FIGS. 2a through 2f illustrate an evolution of a solid nose cone from a typical Axicon lens to a deep draft Axicon lens and finally an Afocal Axicon lens.
Figure 2B:
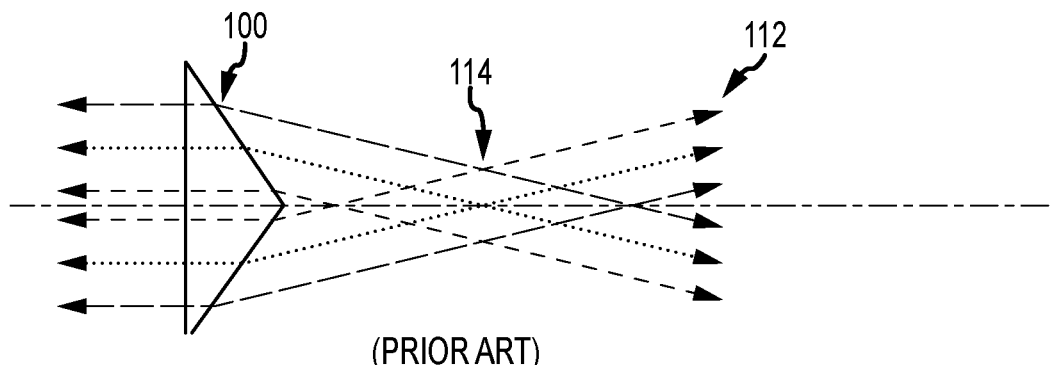

Consider the situation of a solid right-circular cone 100 of transparent material as shown in FIGS. 2a and 2b, which has a specific index of refraction (R.I.) and a specific angle (X) between an exterior surface 102 of the cone and an axis of symmetry 104, also referred to as the cone's half angle. Consider further a ray 106 parallel to the cone's axis of symmetry that passes through the side of the cone as best shown in FIG. 2a.

Because the ray 106 is parallel to the cone's axis of symmetry 104, the ray intersects the surface 102 at an angle equivalent to the cone half angle. The ray also makes an angle (90−θ) with respect to a line 108 normal to the surface of the cone at the place where the ray intersects. Because the cone's material has an index of refraction (R.I.) that is greater than that of air, the ray will refract following Snell's Law, which states that the rays will refract at a new angle with respect to the normal line who's Sine is that of the Sine of original angle between the ray and the normal line (which in this case is 90−θ) divided by the R.I. It is important to note that the Sine of 90−θ is equivalent to Cosine of θ. In other words the new angle with respect to the normal line equals the Arcsine of ((Cosine θ)/R.I.). In the case of a common Axicon lens, such as the one shown in FIGS. 2a and 2b, the ray refracts to the rear, meets a flat trailing surface 110 of the cone, and, according to Snell's Law, is once again refracted towards the central axis before traveling out radially to the side.

Edmund Optics "An In-Depth Look at Axicons" Apr. 16, 2020 describes an Axicon lens. Typical uses of the Axicon lens are best illustrated with the ray tracing shown in FIG. 2b. In these applications, a laser is placed to the left Axicon 100 and emits a beam through the trailing surface 110 that is refracted at exterior surface 102. As shown, a parallel beam is refracted at specific exit angle determined by the cone half angle X and the RI. This can be used to create a "ring shaped beam" 112 that is used for medical applications such as eye surgery. As can also be seen, the rays cross-over the axis of symmetry at a certain distance thereby concentrating the optical power in a small volume 114. This can be used to provide a high power spot or line for certain applications Consider now, FIGS. 2c and 2d, where a solid right-circular cone 120 has been made deeper, and the cone's half angle X has decreased. As in the previous case, the incoming ray 122 refracts upon entry according to Snell's Law and refracts again upon leaving a trailing surface 124 of the cone to once again escape to the side. However, because of the change in initial ray intersection angle, equal to the cone half angle, the incoming rays refracted angle has steepened, and tilted towards an opposing exterior surface 126 of the cone. As the cone depth is increased and the cone's half angle decreases, eventually the ray 122 entering the cone refracts strongly enough to approach and intersect the opposing exterior surface 126 of the cone.

Figure 2C:
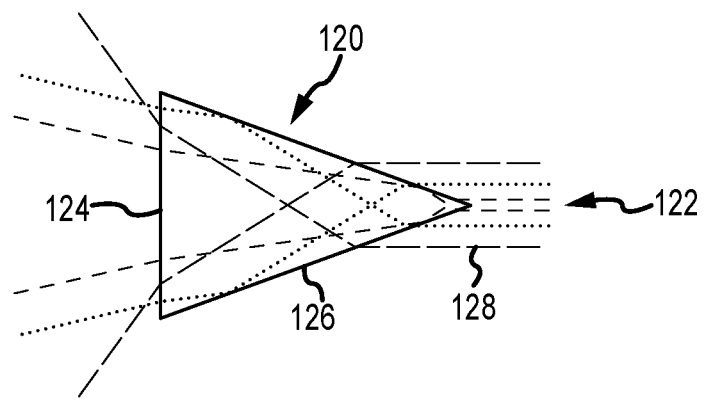

As best seen in FIG. 2c, ray 122 approaches opposing exterior surface 126 of the cone at a shallow angle with respect to the surface. In the case of a ray traveling through transparent optical material, who's index of refraction (RI) is greater than 1, and which approaches a surface exposed to Air or Vacuum who's RI is effectively 1 (air RI=1.00029), it is well established that if the ray approaches at an angle to the surface shallower that of 90-Arcsine(1/RI), measured in degrees, then the ray will experience a condition referred to as Total Internal Reflection (TIR). In TIR, the surface of cone acts like a mirror, completely reflecting all of the ray's energy, with none exiting the surface through refraction.

Because the ray 122 in FIG. 2c approaches the opposite surface of the cone at an angle that is shallower than the threshold angle for total internal reflection (TIR), ray 122 is reflected instead of being refracted. By the laws of reflection, this means that the ray leaves the reflecting surface (opposite side of the cone) at precisely the same angle with respect to the opposite side of the cone as when it approached. This ray is then refracted upon leaving the trailing surface 124 of the cone as before. However the addition of the TIR drastically changes the departure angle of the ray. Also note that if the ray enters too far back from the point of the cone, it intersects the trailing surface of the cone before reaching the cone's opposite side, as shown by ray traces 128.

It should also be noted that if the incoming ray departs from the parallel sufficiently (Increasing X of the entering ray as shown in FIG. 2c), it will eventually refract and approach the opposite side of the cone at an angle steep enough that the ray will not undergo TIR, and will instead refract Over the range of typical refractive indices to cover the UV, visible, IR and mmW bands e.g., 1.14 to 4.32 the approach angle at which the ray would not undergo TIR ranges from 28.6° to 76.6°.

Figure 2D:
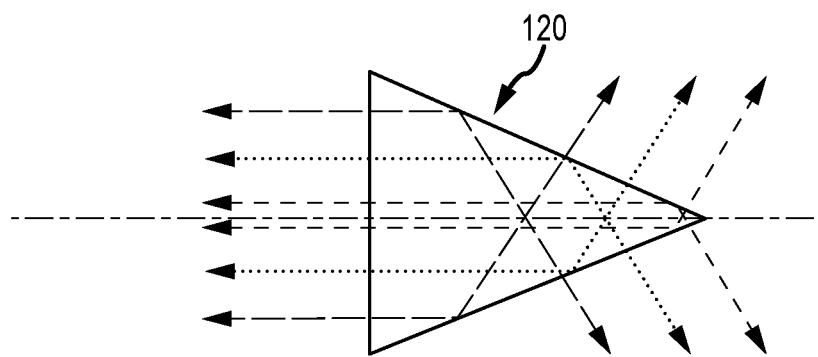

The previously discussed Perryman U.S. Pat. Nos. 9,568, 280 and 9,534,868 utilize a deep draft Axicon lens of the type shown in FIGS. 2a and 2b to relay EMR through the nose cone. In the 9,568,280 patent, EMR incident anywhere along the exterior surface 126 is refracted or undergoes TIR and exits trailing surface 124. The optical relay adaptor (ORA) relay EMR from the trailing surface to form a spot on a quadrant detector. As best shown in FIG. 2c, the incident rays on the nose cone exit the trailing surface 124 at various angles and do not preserve the parallelism of the incident rays. This does not matter because the solid nose cone and ORA only form a spot of the optical centroid of the target. Collecting incident EMR over the entire nose cone to maximize detected power is more important. In the 9,538, 868 patent, as best shown in FIG. 2d, a laser beam is translated across trailing surface 124 to pass through the tip of the nose cone to generate an angular scan pattern 130 in a far field of the laser beam. A detector such as a single pixel annular detector detects reflected laser energy that passes back through the nose cone. In order to generate the angular scan pattern 130, the nose cone must map parallel rays that enter trailing surface 124 at different offsets from the axis of symmetry to different exit angles. The nose cone cannot be configured to maintain parallelism of the rays through the cone.

Figure 2E:
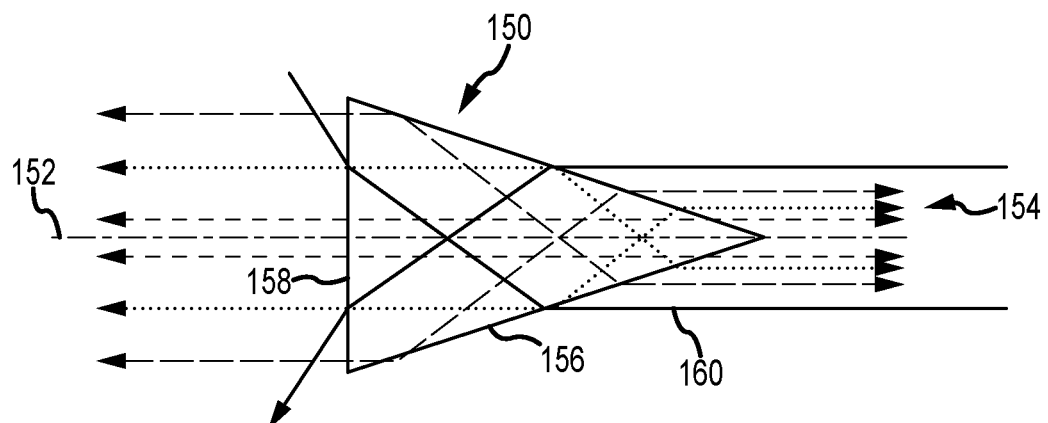
Figure 2F:
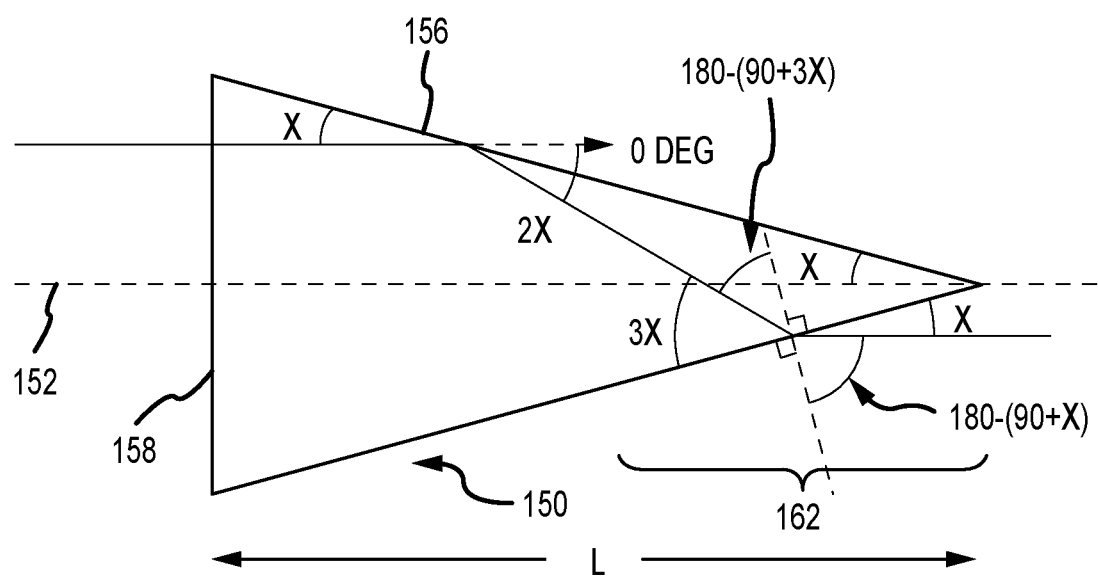

As shown in FIGS. 2e and 2f, in an Afocal Axicon lens that forms a solid nose cone 150 the cone depth L has been increased until the half cone angle X about axis of symmetry 152 is at a very specific angle, which is a mathematical relationship of the cone material's R.I. At this specific relationship, where the material's RI=[Cosine (X)/Cosine (3X)], an incoming ray 154 refracts as usual. However, the ray is refracted at an angle equal to X with respect to an opposing exterior surface 156 of the cone. Since the angle of approach to the cone's opposite side is X, the ray is reflected at the same angle in its departure as shown in FIGS. 2e and 2f, which, in this special case, sets the ray back on a path that is parallel to the original path prior to entering the cone. Since the ray 154 is now approaching the trailing surface 158 of the cone at close to 90 degrees, the ray exits the cone with minimal change in its final path.

As best seen in FIG. 2e, rays 154 entering the nose cone that represent light emanating from a target in a field of regard or, in other words, an "image" of the target, exit the trailing surface with the same parallelism, albeit inverted to relay an inverted image through the nose cone. Unlike the deep draft Axicon lenses shown in FIGS. 2b and 2c used to form a "spot", the Afocal Axicon lens maintains the spatial relationship of rays from a target and thus preserves the information required to form via an imaging lens an EMR image on an imaging detector.

To maintain the parallelism of the rays as they are relayed through the nose cone, the refracted ray must undergo a TIR at the opposing exterior surface 156. If a ray 160 enters too far back from the point of the cone, it intersects the trailing surface 158 of the cone before reaching the cone's opposing exterior surface. In this case, the ray 160 either refracts and escapes to the side where the ray is either absorbed by the light dump to prevent any distortion of the detected image or the ray can be redirected through the use of a frustum of a cone placed behind the solid nose cone as will be described later.

For rays to exit the trailing surface 158 with the same parallelism as which they entered the nose cone, the rays must be incident on a front portion 162 such that the rays under TIR before exiting the trailing surface. The extent of the front section is a function of the cone half angle X.

Figure 3:
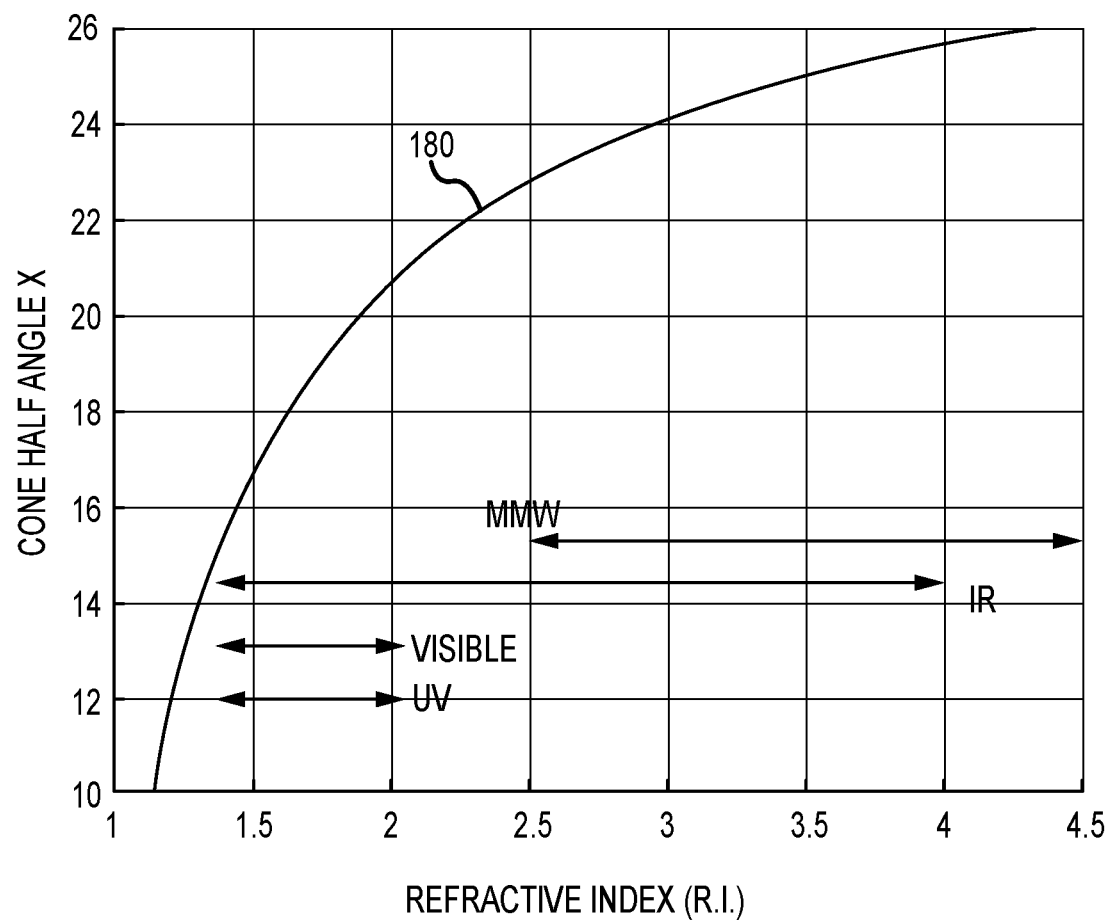
FIG. 3 is a plot of the relationship of the index of refraction (RI) to the half cone angle (X) of the solid right-circular cone to form an Afocal Axicon lens.

As shown in FIG. 3, suitable materials to form a solid nose cone and provide sufficient transparency span a range of refractive indices from approximately 1.14 to 4.32. The UV and Visible bands span approximately 1.14 to 2.0, IR from 1.14 to 4 and mmW from 2.5 to 4.32. This range of RI materials maps to a cone half angle X 180 that spans 10 to 26 degrees.

At RI of 1.14 and a cone half angle of 10 degrees, the front portion 162 extents approximately 35% of cone depth L. At an RI of 4.32 and a cone half angle of 26 degrees, the front portion 162 extends approximately 45% of cone depth L. In any case, a significant portion of the nose cone either cannot be used to collect and relay EMR to form the image or additional steps are required to recover the parallelism of light entering the nose cone after of front portion 162

The Afocal Axicon lens can accept incident EMR within an acceptance cone having a cone half angle M ranging from 31.2° to 90° over the 10 to 26 degree range of half angles and their corresponding RIs for the Afocal Axicon, providing a corresponding field of view.

Figure 4A:
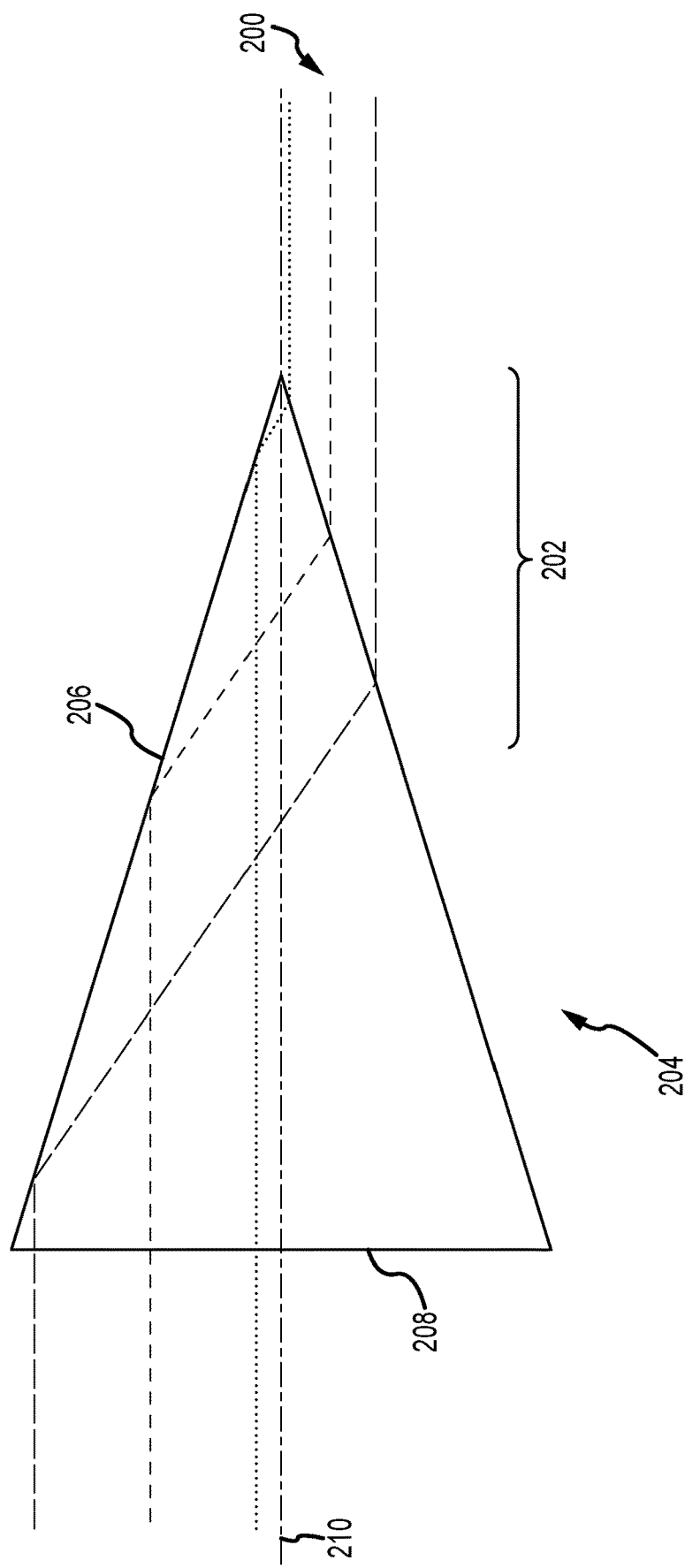
FIGS. 4a through 4c illustrate the ray tracing through an Afocal Axicon lens at 0°, 7.5° and 15°, respectively, that maintains the same parallelism entering and exiting the front portion of the lens for a cone half angle of 17 degrees and RI of 1.519.
Figure 4B:
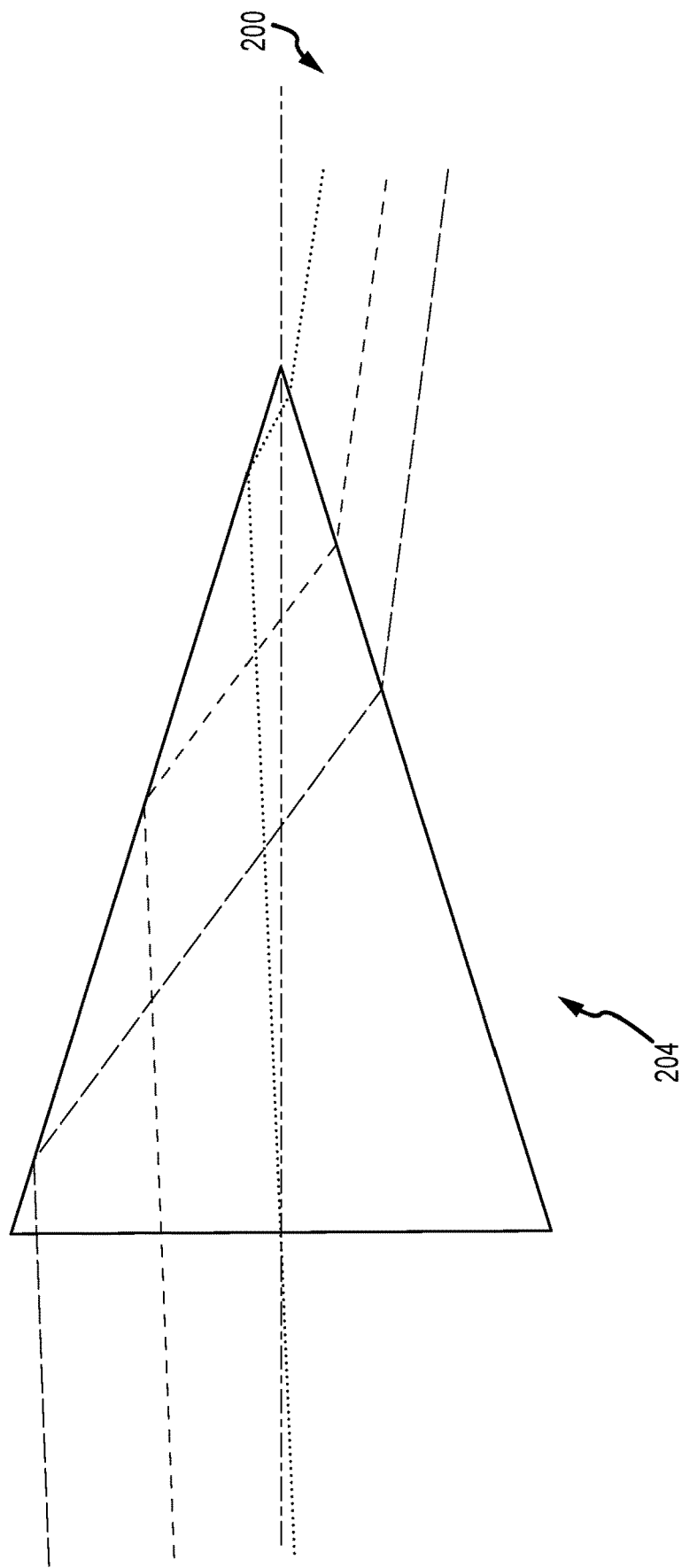
Figure 4C:
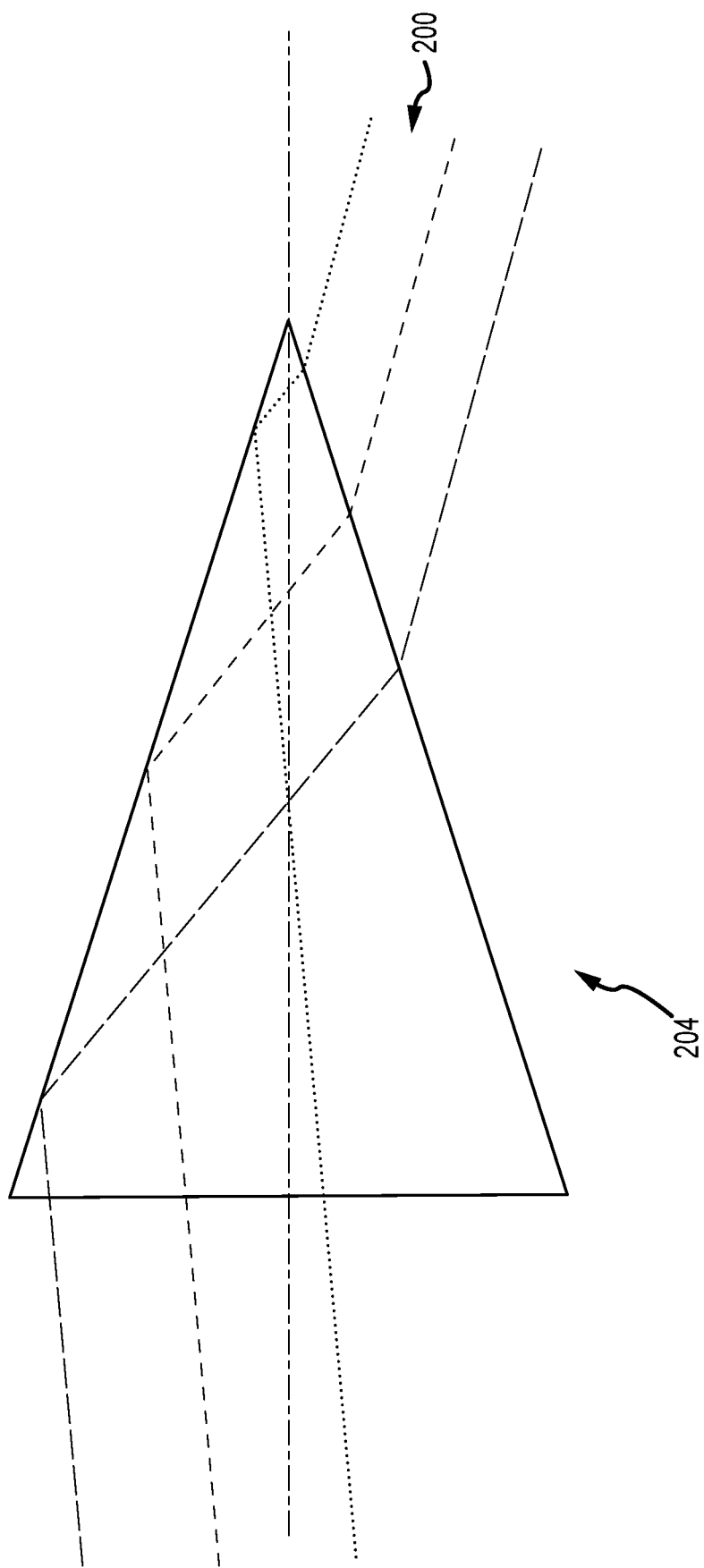

Referring now to FIGS. 4a-4c, a nose cone formed of a transparent material with RI=1.5195 has a cone half angle X=17 degrees. As shown in FIG. 4a, rays 200 entering a front portion 202 of a solid nose cone 204 formed as an Afocal Axicon lens at an acceptance angle of 0° undergo a TIR reflection on an opposing exterior surface 206 and exit a trailing surface 208 at an exit angle of 0° and inverted with respect to an axis of symmetry 210. As shown in FIG. 4b, rays 200 enter the front portion 202 at an acceptance angle of 7.5° undergo a TIR reflection and exit the trailing surface at an exit angle of 7.5° preserving the parallelism and forming an inverted image. As shown in FIG. 4b, rays 200 enter the front portion 202 at an acceptance angle of 15° undergo a TIR reflection and exit the trailing surface at an exit angle of 15° preserving the parallelism and forming an inverted image. Beyond an acceptance half angle of 61 degrees, the incoming ray refracts at an angle with respect to the opposite side of the cone which is large enough to fall outside the range where total internal reflection can occur. At that point the ray refracts through the opposite side of the cone.

Figure 5:
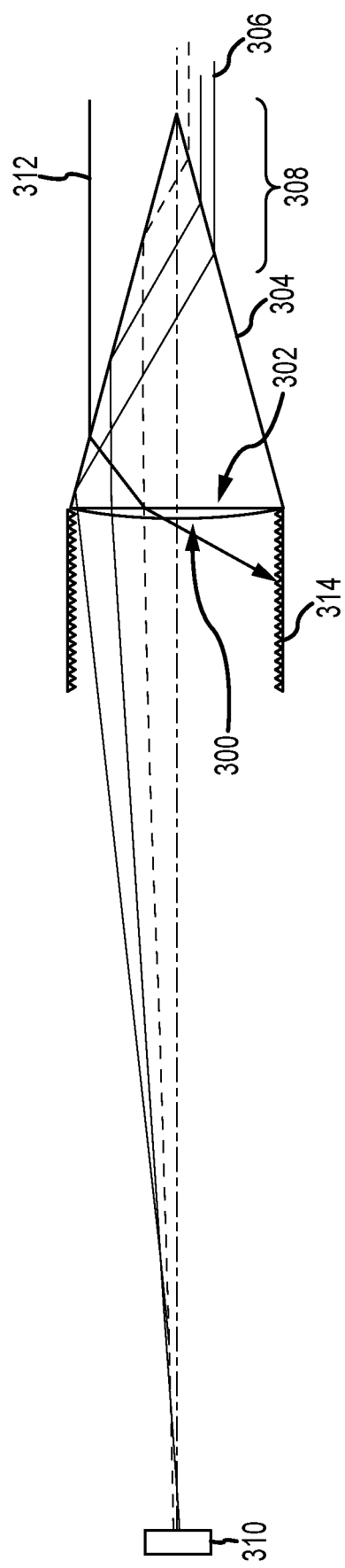
FIG. 5 is an embodiment of a solid nose cone in which an imaging lens is formed on a trailing surface of the solid right-circular cone.

Referring now to FIG. 5, an imaging lens 300 is integrated on a trailing surface 302 of a solid right-circular cone 304 to focus EMR 306 that exits the trailing surface with the same parallelism it enters a front portion 308 the cone onto an imaging detector 310. EMR 312 that enters the cone aft of front portion 308 does not undergo TIR and exits the trailing surface at an outward angle where it is absorbed by a light dump 314. The entire optical system e.g. the Afocal Axicon lens and imaging lens 300 may be monolithically integrated into the nose cone to eliminate alignment issues and moving parts. Other optical elements such as a polarization filter, half-wave plate or retarder may be integrated into the trailing surface of the solid nose cone.

As has been described in detail, only rays entering a "front portion" of the solid nose cone maintain their parallelism as they exit the trailing surface of the cone. To avoid degrading the image that is focused onto the imaging detector, the rays that enter aft of this front portion must either be dumped or somehow re-directed to reestablish their parallelism. The front portion ranges from between 35% to 45% of the depth of the nose cone, which means considerable surface area is lost for collecting and relaying EMR to form the image of a target. This is clearly undesirable. To extend the usable area to include more of the exterior surface area (except the trailing surface) of the solid right-circular cone, a "frustum" of a cone is optically coupled to the trailing surface to re-establish the parallelism of the rays that would otherwise escape and be dumped. Depending upon the application the frustum may be designed to capture, for example, another volume of incident light directly aft of the front portion but not capture EMR at the very back of the solid right-circular cone. In other applications, the frustum may be designed to capture EMR on the entire volume of the solid nose cone. The goal being to achieve efficiencies comparable to traditional optics.

Figure 6A:
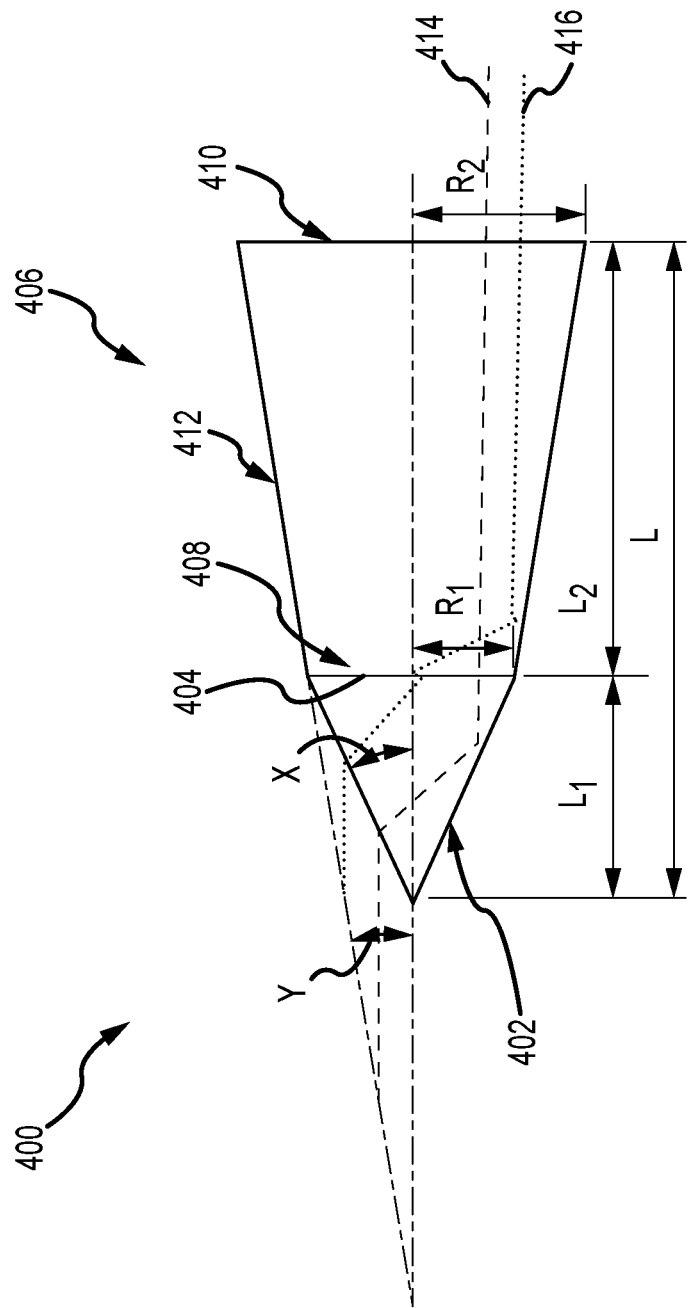
FIGS. 6a through 6c are diagrams of an Afocal bi-conic lens and embodiment thereof in which EMR incident aft of the front portion of the solid right-circular cone exits the bi-conic lens with the same parallelism it entered the cone and exits the bi-conic lens and is focused onto an imaging detector.
Figure 6B:
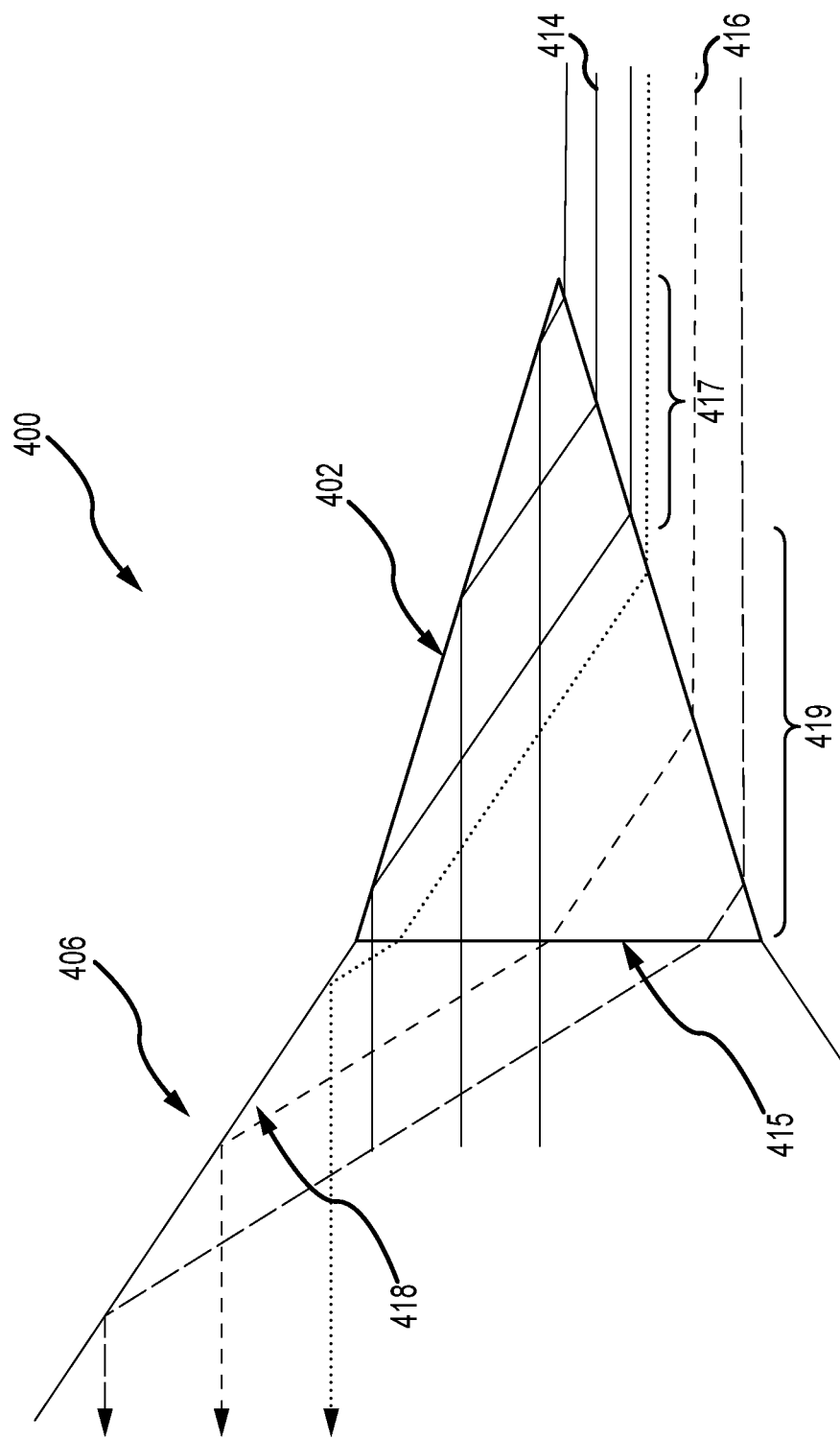
Figure 6C:
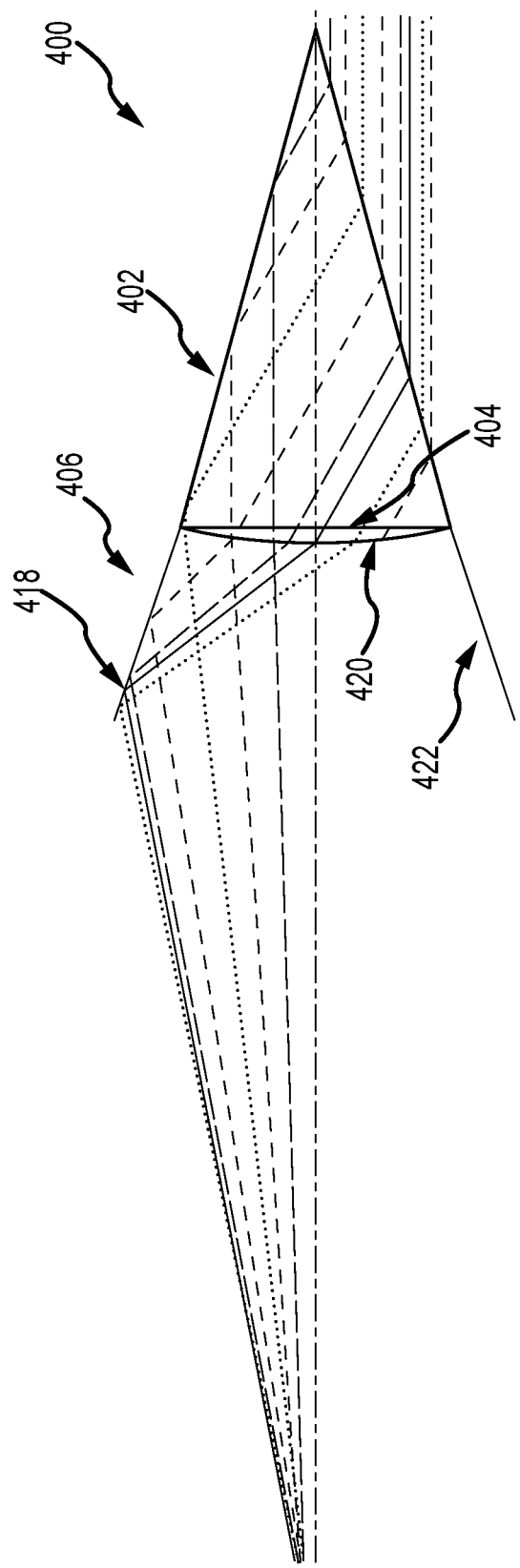

Referring now to FIGS. 6a-6c, an Afocal Bi-Conic Lens 400 of length L includes a solid right-circular cone 402 that is Afocal e.g., RI≈ cos(X)/cos(3X) where RI is an effective refractive index, L1 is the length and X is a cone half angle of the solid right-circular cone having a trailing surface 404. A frustum of a cone 406 has front and trailing surfaces 408 and 410, respectively, separated by an exterior surface 412, with radii R1 and R2 where R2>R1, a cone half angle of Y and length L2. Front surface 408 of the frustum engages the trailing surface 404 of the solid right-circular cone such that EMR incident anywhere on the solid right-circular cone exits the trailing surface of the frustum with approximately the parallelism with which the EMR entered the solid right-circular cone. EMR 414 that enters the front portion of the solid right-circular cone exits the trailing surface 404 with the same parallelism and propagates through the frustum. EMR 416 that enters aft of the front portion exits the trailing surface 404 at an angle such that it reflects off the opposing exterior surface 412 to re-establish the same parallelism with which it entered the nose cone.

The cone half angle Y is a function of both the cone half angle X of the solid right-circular cone and the RI of the frustum itself. The frustum could be a solid object of the same or different transparent material or could be hollow and exhibit an index of air. The precise half angle and requisite length of the frustum is a function of the relative RIs of the cone and the frustum. In the case where the RI of the frustum is less than that of the cone, the frustum's cone half angle will be greater than that of the cone. In cases where the RI of the frustum is greater than that of the cone, then the frustum's half angle will be less than that of the cone, with the exact degree being a related of the ratios of the two RIs. Precise frustum parameters will be a function of specific design parameters.

To reduce the overall weight of the nose cone assembly, as shown in FIG. 6b the frustum of the cone 406 is preferably hollow and has an inner mirrored surface 418 that redirects EMR 416. Because the effective refractive index of the frustum is that of air and less than the RI of the solid right-circular cone, the cone half angle Y of the frustum is greater than the cone half angle X of the solid right-circular cone. In this configuration, EMR incident on a back portion 419 refracts to the inner mirrored surface 418. The back portion 419 extends aft from the front portion 417 to the trailing surface 415 of the solid nose cone. In other configurations, the back portion 419 would extend aft from front portion 417 but stop short of the trailing surface.

As shown in FIG. 6c, the imaging lens can incorporated into both the solid right-circular cone 402 and the frustum 406. As before, an imaging lens 420 is integrated on the trailing surface 404 of cone 402 to focus any EMR incident on the front portion of the cone and exiting the trailing surface 404 with the same parallelism. An imaging lens 422 is integrated into inner mirror surface 418 to focus any EMR incident aft of the front portion of the cone that exits the trailing surface at a different parallelism and reflects off the inner mirror surface 418. Imaging lens 422 manifests as a slight curvature of the mirrored surface.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. A nose cone comprising a solid right-circular cone that is transparent to electromagnetic radiation (EMR) of at least one wavelength, said solid right-circular cone configured with an effective refractive index (RI)≈cos(X)/cos(3X) where X is a cone half angle of the solid right-circular cone to form an Afocal Axicon lens in which EMR incident on a front portion of the solid right-circular cone exits a trailing surface of the solid right-circular cone with approximately the same parallelism with which the EMR entered the front portion of the solid right-circular cone.

2. The nose cone of claim 1, wherein EMR incident on the front portion of the solid right-circular cone refracts and propagates through the solid right-circular cone where it undergoes a total internal reflection (TIR) at an opposing exterior surface and then exits the trailing surface.

3. The nose cone of claim 1, wherein the EMR exits the trailing surface with the same parallelism with which it entered the nose cone plus or minus 5%.

4. The nose cone of claim 1, wherein RI is between 1.14 to 4.32 and X is between 10 and 26 degrees.

5. The nose cone of claim 1, wherein the front portion is approximately the forward 35% to 45% of the solid right-circular cone for X between 10 and 26 degrees.

6. The nose cone of claim 1, further comprising:
an imaging detector;
an imaging lens that captures and focuses only the EMR that is incident on the front portion of the solid right-circular cone and exits the trailing surface of the solid right-circular cone to form an image on the imaging detector; and
a light dump that absorbs EMR incident behind the front portion of the solid right-circular cone that exits the trailing surface of the solid right-circular cone with a different parallelism than it entered the cone,
wherein the imaging detector, imaging lens and light dump are positioned aft of the trailing surface of the solid right-circular cone.

7. The nose cone of claim 6, wherein the imaging lens is integrated on the trailing surface of the solid right-circular cone.

8. The nose cone of claim 7, wherein no additional optical element is present in a path from the imaging lens to the imaging detector.

9. The nose cone of claim 1, wherein the trailing surface of the solid right-circular cone has a radius R1 and a cone half angle X, further comprising:
a frustum of a cone having front and trailing surfaces with radii R1 and R2 where R2>R1 and a cone half angle of Y, wherein the front surface of the frustum engages the trailing surface of the solid right-circular cone such that EMR incident aft of the front portion exits the trailing surface of the frustum with approximately the parallelism with which the EMR entered the solid right-circular cone.

10. The nose cone of claim 9, wherein the frustum comprises a hollow shell in which Y>X, said hollow shell having an interior surface that reflects the EMR such that the reflected EMR has approximately the same parallelism with which it entered behind the front surface of the solid right-circular cone.

11. The nose cone of claim 10, further comprising:
an imaging detector;
a first imaging lens integrated on the trailing surface of the solid right-circular cone to focus EMR incident on the front portion of the solid right-circular cone onto the imaging detector; and
a second imaging lens integrated into the interior surface of the fustrum to focus the remaining EMR incident on a back portion of the solid right-circular cone onto the imaging detector,
wherein the imaging detector, first and second imaging lenses and light dump are positioned aft of the trailing surface of the solid right-circular cone.

12. A nose cone comprising a solid right-circular cone that is transparent to electromagnetic radiation (EMR) of at least one wavelength in either the UV, visible, IR or MMW bands, the solid right-circular cone having a tip, an exterior surface that extends aft from tip at a cone half angle X from an axis of symmetry between 10 and 26 degrees and a trailing surface, said solid right-circular cone having an effective refractive index (RI) between 1.14 to 4.32 where RI≈cos(X)/cos(3x) to form an Afocal Axicon lens where EMR having a parallelism entering a front portion of the solid right-circular cone within an acceptance cone having an acceptance half angle Y of less than 30 degrees from the axis of symmetry undergoes a total internal reflection (TIR) and exits the trailing surface with the same parallelism which the EMR entered the front portion of the solid right-circular cone.

13. The nose cone of claim 12, wherein the trailing surface of the solid right-circular cone has a radius R1, further comprising:
 a frustum of a cone having front and trailing surfaces with radii R1 and R2 where R2>R1 and a cone half angle of Y, wherein the front surface of the frustum engages the trailing surface of the solid right-circular cone such that EMR incident aft of the front portion exits the trailing surface of the frustrum with approximately the parallelism with which the EMR entered the solid right-circular cone.

14. The nose cone of claim 12, further comprising a light dump that absorbs EMR incident behind the front portion of the solid right-circular cone that exits the trailing surface of the solid right-circular cone with a different parallelism than it entered the cone.

15. A guided flight vehicle comprising:
 a body having an axis of symmetry;
 a nose cone mounted forward of the body, the nose cone comprising a solid right-circular cone that is transparent to electromagnetic radiation (EMR) of at least one wavelength, said solid right-circular cone configured with an effective refractive index (RI)≈cos(X)/cos(3X) where X is a cone half angle of the solid right-circular cone to form an Afocal Axicon lens such that EMR incident on a front portion of the solid right-circular cone exits a trailing surface of the solid right-circular cone with approximately the same parallelism with which the EMR entered the nose cone;
 an imaging lens that focuses the EMR exiting the trailing surface of the solid right-circular cone with the same parallelism into an EMR image;
 an imaging detector that converts the EMR image into an array of detected electrical charges; and
 a read out integrated circuit (ROIC) configured to measure the array of detected electrical charges over a specified interval and output electrical signals proportional to the charge as a read out image,
 wherein the imaging lens, imaging detector and ROIC are positioned aft of the trailing surface of the solid right-circular cone.

16. The guided flight vehicle of claim 15, wherein the imaging lens is integrated on the trailing surface of the solid right-circular cone, wherein no additional optical element is present in a path from the imaging lens to the imaging detector.

17. The guided flight vehicle of claim 15, further comprising a light dump positioned aft of the trailing surface of the solid right-circular cone, wherein said light dump absorbs EMR incident behind the front portion of the solid right-circular cone that exits the trailing surface of the solid right-circular cone with a different parallelism than it entered the cone so that the EMR is not focused or otherwise directed onto the imaging detector.

* * * * *